United States Patent [19]

Adams

[11] 4,154,377

[45] May 15, 1979

[54] GREASE SUPPLY CARTRIDGE FOR DISPENSING

[75] Inventor: Hunter D. Adams, Charlotte, N.C.

[73] Assignee: Petrolube Corporation, Charlotte, N.C.

[21] Appl. No.: 803,519

[22] Filed: Jun. 6, 1977

[51] Int. Cl.² ............................................. B67D 5/42
[52] U.S. Cl. .................................... 222/389; 222/327
[58] Field of Search ....................... 222/326, 327, 389

[56] References Cited

U.S. PATENT DOCUMENTS

| 2,049,182 | 7/1936 | Tear .................................. 222/327 X |
| 2,277,824 | 3/1942 | Franson ........................... 222/389 X |
| 2,887,253 | 5/1959 | Biedenstein ......................... 222/327 |
| 3,245,591 | 4/1966 | Kneusel et al. ...................... 222/389 |
| 3,815,791 | 6/1974 | Clark .................................... 222/326 |
| 3,917,124 | 11/1975 | Kifer ............................... 222/389 X |

FOREIGN PATENT DOCUMENTS 809161 2/1959 United Kingdom .................... 222/389

*Primary Examiner*—David A. Scherbel
*Attorney, Agent, or Firm*—Richards, Shefte & Pinckney

[57] ABSTRACT

An improved grease supply cartridge is provided for pressure actuated dispensers, which contains the grease to be dispensed in a relatively rigid cylindrical paperboard body fitted with a piston formed of thin-walled flexible plastic material that reacts with particular effectiveness under the pressure applied for dispensing to exhaust the cartridge supply completely and advantageously.

8 Claims, 3 Drawing Figures

GREASE SUPPLY CARTRIDGE FOR DISPENSING

BACKGROUND OF THE INVENTION

Pressure-actuated grease dispensers have been in use for some time to lubricate industrial machines, such as looms in textile mill weave rooms. The dispensers commonly comprise a pressure chamber to which compressed air is fed for actuating the dispensing and in which a grease supply cartridge is inserted with a piston covering the grease supply that is forced by the air pressure to dispense the grease from the cartridge. Difficulty has been encountered, however, in providing the supply cartridges for reliable operation so that the piston consistently forces the grease supply for dispensing without bypassing grease wastefully or allowing air to leak into the grease to form an air lock that causes the dispenser to become inoperative.

The present invention solves this problem by providing grease supply cartridges for such dispensers that are uniquely suited for dependable use.

SUMMARY OF THE INVENTION

The improved grease supply cartridge of the present invention combines a relatively rigid cylindrical laminated paperboard body loaded with grease and having a closure member fixed at one end of the body with a removable cap carried therein for providing an exit port for dispensing the grease together with a piston in the body covering the grease that is formed of a thin-walled flexible plastic material. The cup-shaped piston has an upstanding peripheral flange that is gently flared outwardly with the flange edge having an outside diameter at the top slightly larger than the inside diameter of the cartridge body. As a result, the dispensing pressure induces an airtight contact of the piston within the cartridge body that provides consistently effective dispensing action.

DETAILED DESCRIPTION OF THE INVENTION

Figure 1:
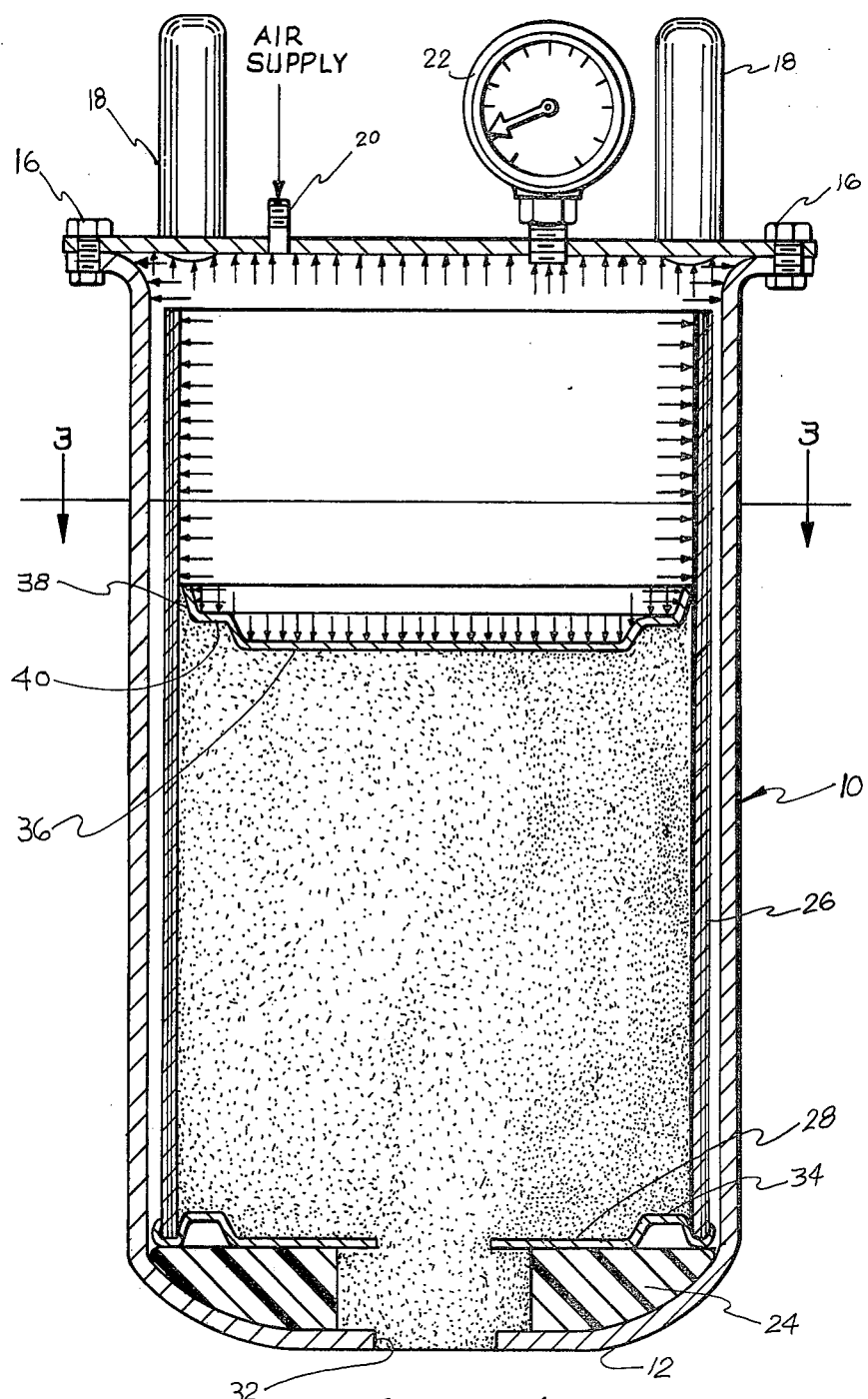
FIG. 1 is a vertical section illustrating the general arrangement of a pressure actuated-grease dispenser.

FIG. 1 of the drawings shows the pressure chamber 10 of the dispensing device having a dished bottom 12 for withstanding pressure and a detachable lid 14 fixed in place by bolts 16 and having handles 18 for manipulation whenever a grease supply cartridge has to be inserted, together with a fitting 20 at which an air supply line (not shown) may be attached and a pressure gauge 22. The dished bottom 12 of chamber 10 contains an annular cushion member 24, of polyvinyl chloride or the like, forming a support for the bottom of an inserted grease cartridge 26 and is centrally apertured for connection of a dispensing fitting (not shown).

Figure 2:
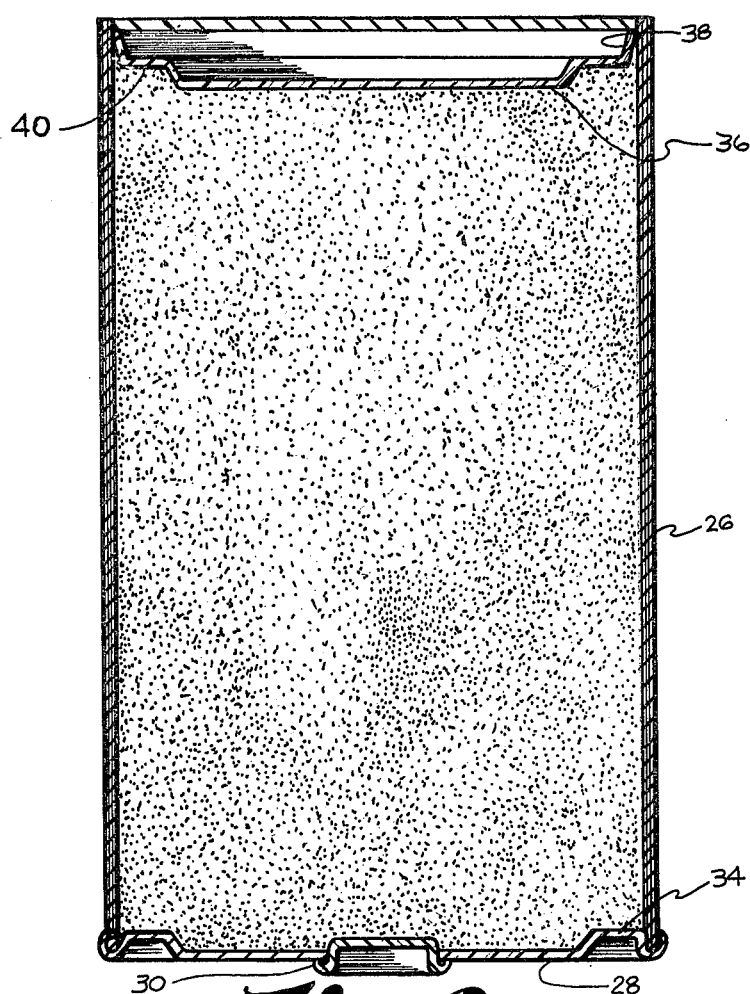
FIG. 2 is a vertical section of a grease supply cartridge as provided for insertion in the FIG. 1 dispenser.
Figure 3:
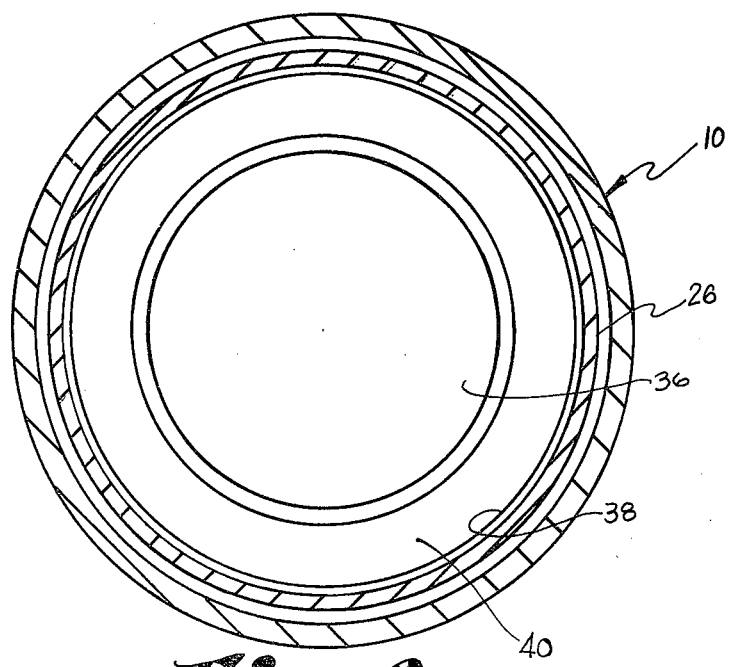
FIG. 3 is a horizontal section as seen substantially at the line 3—3 in FIG. 1.

The grease cartridge 26 is shown in FIG. 2 as it is supplied for use. As shown the cartridge is composed of a relatively rigid cylindrical laminated paperboard body, suitably having a wall thickness of about 150" a diameter on the order of 9½" and a length of about 18⅜", so as to carry 38 pounds of grease, and preferably having an inner ply of aluminum foil so as to be resistant to grease. The bottom end of this body 26 has an end closure 28 crimped thereon in fixed transverse relation and carries a removable cap 30 therein to provide an exit port for grease as it is released through a dispensing fitting (not shown) attached at a central aperture 32 in the dished bottom 12 of chamber 10. The end closure 28 is also formed with annular ribbing 34 having a generally hat-shaped radial cross-section adjacent and inside the cartridge body 26 for reinforcing purposes and to provide for securely crimping it in place.

Additionally, the grease cartridge 26 includes a free piston 36 disposed in covering relation over the contained grease. This piston 36 is formed of a thin-walled, e.g. about 40 mils, plastic material such as polystyrene or other similar material that is impervious to grease. The piston 36 has an upstanding peripheral flange 38 thereon that is gently flared outwardly, e.g. at about 6° from vertical, with the upper flange edge having an outside diameter slightly larger than the inside diameter of the cartridge 26 so as to provide for airtight contact with the cartridge wall. Also, the piston 36 has its inner face formed at 40 in nesting relation with the end closure ribbing 34 for interfitting therewith so as to provide for completely exhausting grease from the cartridge 26 and for forming a "drop center" portion of the piston 36 as shown in FIG. 1 in the vicinity of the end of the leader from the numeral 36 for receiving substantially below the location of said air tight contact about half of the downward pressure exerted on the piston 36 by the aforementioned compressed air as indicated by the multiplicity of small arrows directed perpendicularly to the flat inside surface of the drop center in FIG. 1. The aforesaid nesting relation results in an annular peripheral portion of the piston disposed transversely of the cartridge 26, and a W-shaped radial cross-section of the piston adjacent its periphery as shown in the vicinity of the ends of the leaders from the numerals 36, 38 and 40 in FIG. 1, the drop center being connected to the annular portion by a generally annular upstanding wall.

In operation, a FIG. 2 cartridge is installed in the dispenser chamber 10 as shown in FIG. 1 and air pressure is applied through the fitting 20 commonly at about 15–50 pounds per sq. in. Under such air pressure the dispenser outlet fitting (not shown) is operated to release grease. The pressure within chamber 10 acts on piston 36 to force grease from cartridge 26. The pressure being exerted against the piston flange 38 maintains airtight contact with the wall of the cartridge despite any eccentricity or other deformity in cartridge 26. As the dispensing continues piston 36 ultimately reaches the bottom of cartridge 26 at an interfitted relation with end closure 28 so that all grease is expelled, and a fresh cartridge is then installed in chamber 10 to continue operations.

The present invention has been described in detail above for purposes of illustration only and is not intended to be limited by this description or otherwise to exclude any variation or equivalent means that would be apparent or reasonably suggested by the foregoing disclosure to the skill of the art.

I claim:

1. In an air-pressure-actuated grease dispenser pressure chamber having an aperture in the bottom thereof for dispensing grease contained therein, an air pressure supply therefor, and an annular cushion support disposed in the bottom thereof above said aperture for passage of said grease being dispensed, an improved supply cartridge on the order of nine and one-half inch diameter for the grease to be dispensed comprising a relatively rigid cylindrical laminated paperboard body loaded with grease for insertion within said chamber and further characterized by (a) An end closure member fixed at one end of said body and substantially transverse thereto, significantly annularly inwardly ribbed for reinforcement adjacent thereto, and having a port in said member and a removable cap therefor for providing an exit for dispensed grease through said support when placed over and in contact with said cushion support; and (b) a free piston in said body at the other end thereof covering the grease therein for forcing the grease therefrom upon application of air pressure within said chamber and thereby on said piston, said piston being formed of a thinwalled flexible plastic material that is impervious to grease and having an annular peripheral portion transverse to said body, a drop center of said piston surrounded by said annular portion and provided for receiving on said drop center a significant portion of said pressure on said piston, a generally annular upstanding wall connecting said annular portion and said drop center, and an upstanding peripheral flange on said annular portion that is gently flared outwardly with the upper flange edge having an outside diameter slightly larger than the inside diameter of said body to provide airtight contact with the inside wall of said cylindrical body prior to said pressure application and to maintain said airtight contact during said dispensing by said pressure exerted against said flange and together with said pressure received on said drop center substantially below the location of said airtight contact during said dispensing acting to continue said dispensing until said piston reaches the bottom of said cartridge at an interfitted relation with said end closure thereby preventing by-passing said grease on said cylindrical wall and preventing allowing air to leak past said piston into said grease, said flange, annular portion, wall, and drop center being proportioned to form a generally W-shaped radial cross-section of said piston adjacent its periphery for reinforcing said piston and nesting and interfitting with the reinforcing ribbing of said closure member for essentially completely expelling said grease from said chamber.

2. An improved supply cartridge for grease as defined in claim 1 wherein said laminated paperboard body includes an inner ply of aluminum foil.

3. An improved supply cartridge for grease as defined in claim 1 wherein said piston flange is flared outwardly at an angle of 6° from vertical.

4. An improved supply cartridge for grease as defined in claim 1 wherein said piston is formed of polystyrene.

5. An improved supply cartridge for grease as defined in claim 1 wherein said plastic material has a maximum thickness on the order of 0.040 inches.

6. An improved supply cartridge for grease as defined in claim 1 wherein about half of said pressure on said piston is received on said drop center.

7. An improved supply cartridge for grease as defined in claim 6 wherein said end closure member has a generally hat-shaped radial cross-section formed where significantly annularly inwardly ribbed as aforesaid adjacent said cartridge body.

8. An improved supply cartridge for grease as defined in claim 7 wherein said end closure member has a substantially flat central portion, and said transverse annular portion and said drop center of said piston are substantially flat.

* * * * *